(12) United States Patent
Bao et al.

(10) Patent No.: US 11,904,381 B2
(45) Date of Patent: Feb. 20, 2024

(54) METHOD FOR PRODUCING A GEAR WORM WHICH IS LOCATED IN PARTICULAR ON AN ARMATURE SHAFT, AND SUCH A GEAR WORM

(71) Applicant: Robert Bosch GmbH, Stuttgart (DE)

(72) Inventors: Jie Bao, Shanghai (CN); Bernhard De Graaff, Karlsruhe (DE); Daniel Cettier, Karlsruhe (DE); Guang Qiao, Shanghai (CN); Holger Thoene, Rastatt (DE); Otmar Hertwig, Buehl (DE); Volker Hertweck, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 17/285,219

(22) PCT Filed: Oct. 4, 2019

(86) PCT No.: PCT/EP2019/076863
§ 371 (c)(1),
(2) Date: Apr. 14, 2021

(87) PCT Pub. No.: WO2020/078734
PCT Pub. Date: Apr. 23, 2020

(65) Prior Publication Data
US 2022/0055092 A1 Feb. 24, 2022

(30) Foreign Application Priority Data

Oct. 15, 2018 (DE) .................... 10 2018 217 617.5

(51) Int. Cl.
*B21H 5/00* (2006.01)
*E05F 15/697* (2015.01)
(Continued)

(52) U.S. Cl.
CPC ............... *B21H 5/005* (2013.01); *B22F 3/18* (2013.01); *B23P 15/14* (2013.01); *B24B 21/006* (2013.01);
(Continued)

(58) Field of Classification Search
CPC . B21H 5/005; F16H 57/0498; F16H 57/0431; Y10T 74/19991; B24B 19/12; B24B 21/006
See application file for complete search history.

(56) References Cited

U.S. PATENT DOCUMENTS 1,773,386 A * 8/1930 Burgess ................ B24B 53/083
125/11.03
2,062,696 A * 12/1936 Brown ................... B21H 5/022
29/90.6
(Continued)

FOREIGN PATENT DOCUMENTS

CN         1520962 A     8/2004
CN       206169828 U     5/2017
(Continued)

OTHER PUBLICATIONS

DE1080380B translation (Year: 1960).*
(Continued)

*Primary Examiner* — Michael W Hotchkiss
(74) *Attorney, Agent, or Firm* — Michael Best & Friedrich LLP

(57) ABSTRACT

The invention relates to a method for producing a gear worm (12) which is located in particular on an armature shaft (14) of an electromotive drive unit (10), wherein firstly a worm gear (20) having screw flanks (22) axially opposite one another on a longitudinal axis (18) is formed by means of a rolling tool, and subsequently a groove structure (24) which is concentric about the longitudinal axis (18) is formed on
(Continued)

the screw flanks (22) by means of an additional process step. The invention also relates to a gear worm (12) produced according to the method according to the invention, and to a transmission drive unit (10) containing such a gear worm (12).

12 Claims, 2 Drawing Sheets

(51) Int. Cl.

| | |
|---|---|
| B23P 15/14 | (2006.01) |
| B24B 21/00 | (2006.01) |
| B24B 21/16 | (2006.01) |
| B24B 49/14 | (2006.01) |
| B24D 15/00 | (2006.01) |
| F16H 55/24 | (2006.01) |
| F16H 57/00 | (2012.01) |
| F16H 57/04 | (2010.01) |
| B22F 3/18 | (2006.01) |
| B22F 3/16 | (2006.01) |
| B60N 2/02 | (2006.01) |

(52) U.S. Cl.
CPC .............. *B24B 21/16* (2013.01); *B24B 49/14* (2013.01); *B24D 15/00* (2013.01); *E05F 15/697* (2015.01); *F16H 55/24* (2013.01); *F16H 57/0006* (2013.01); *F16H 57/0498* (2013.01); *B22F 2003/166* (2013.01); *B60N 2/02253* (2023.08)

(56) References Cited

U.S. PATENT DOCUMENTS

| | | | | |
|---|---|---|---|---|
| 2,274,491 | A * | 2/1942 | Mentley | B23F 21/28 |
| | | | | 76/115 |
| 2,736,994 | A * | 3/1956 | Whittum | B23F 5/02 |
| | | | | 451/364 |
| 2,823,494 | A * | 2/1958 | Board, Jr. | B23F 5/02 |
| | | | | 451/47 |
| 2,843,977 | A * | 7/1958 | Kuhns | B24B 21/006 |
| | | | | 451/47 |
| 3,516,298 | A * | 6/1970 | Arndt | F16H 55/22 |
| | | | | 74/427 |
| 3,802,130 | A * | 4/1974 | Lindenbeck | B24D 5/14 |
| | | | | 451/544 |
| 4,148,227 | A * | 4/1979 | Neugebauer | F16H 57/0498 |
| | | | | 74/467 |
| 4,475,319 | A * | 10/1984 | Wirz | B24B 53/083 |
| | | | | 409/12 |
| 4,833,834 | A * | 5/1989 | Patterson | B24B 21/006 |
| | | | | 451/239 |
| 4,945,683 | A * | 8/1990 | Phillips | B24B 21/16 |
| | | | | 451/449 |
| 5,210,978 | A * | 5/1993 | Phillips | B24B 19/12 |
| | | | | 451/303 |
| 5,251,404 | A * | 10/1993 | Wasserbaech | B24B 17/10 |
| | | | | 451/303 |
| 5,367,866 | A * | 11/1994 | Phillips | B24B 21/02 |
| | | | | 451/14 |
| 5,392,566 | A * | 2/1995 | Wedeniwski | B24B 19/12 |
| | | | | 451/62 |
| 5,951,377 | A * | 9/1999 | Vaughn | B24B 49/00 |
| | | | | 451/49 |
| 6,357,071 | B2 * | 3/2002 | Moinpour | B24B 37/04 |
| | | | | 15/97.1 |
| 2008/0168854 | A1 * | 7/2008 | Iwano | B23H 9/003 |
| | | | | 74/425 |
| 2009/0056489 | A1 * | 3/2009 | Niederer | F16H 55/06 |
| | | | | 29/893.31 |
| 2018/0056472 | A1 * | 3/2018 | Hosokai | B23G 1/36 |
| 2019/0232454 | A1 * | 8/2019 | Hosokai | B24B 41/061 |

FOREIGN PATENT DOCUMENTS

| | | | | |
|---|---|---|---|---|
| CN | 107433368 | A | 12/2017 | |
| DE | 1080380 | B * | 4/1960 | .............. B23F 21/28 |
| DE | 4132115 | A1 | 4/1992 | |
| DE | 102011006276 | A1 | 10/2012 | |
| DE | 102017204835 | A1 | 9/2018 | |
| EP | 1303168 | A1 | 4/2003 | |
| EP | 1780446 | A1 | 5/2007 | |
| EP | 2208915 | A2 | 7/2010 | |
| GB | 2072069 | A * | 9/1981 | .............. B21H 5/022 |
| JP | 2003207031 | A | 7/2003 | |
| JP | 2004092697 | A * | 3/2004 | ......... F16H 57/0431 |
| JP | 2007155120 | A | 6/2007 | |
| JP | 2007292179 | A | 11/2007 | |
| JP | 4773869 | B2 * | 9/2011 | |
| KR | 20140098572 | A * | 8/2014 | |
| WO | WO2003026814 | A1 * | 4/2003 | .............. F16H 55/22 |

OTHER PUBLICATIONS

JP-2004092697-A translation (Year: 2004).*
WO2003026814A1 translation (Year: 2003).*
JP4773869B2 translation (Year: 2011).*
KR20140098572A translation (Year: 2014).*
Translation of International Search Report for Application No. PCT/EP2019/076863 dated dated Dec. 12, 2019 (3 pages).

* cited by examiner

METHOD FOR PRODUCING A GEAR WORM WHICH IS LOCATED IN PARTICULAR ON AN ARMATURE SHAFT, AND SUCH A GEAR WORM

BACKGROUND OF THE INVENTION

The invention relates to a method for producing a gear worm which is arranged, in particular, on an armature shaft, and to a gear worm of this type.

DE 102 011 006 276 A1 has disclosed a gearwheel, on the tooth flank faces of which axial grooves are configured which serve as a lubricant reservoir. During operation, lubricant can be conducted to the friction-critical regions of a toothing system by way of said grooves, without the lubricant being displaced completely. A gearwheel of this type can also be configured, for example, as a worm gear for a worm gear mechanism. Although reliable lubrication of the toothing system can be ensured by way of a configuration of this type, there is the tendency here that the self-locking action of a gear mechanism of this type is reduced by way of the continuous lubrication. There are applications, however, such as, for example, actuating drives in the motor vehicle which adjust window panes, sunroofs or seat parts, in the case of which a relatively high self-locking action is desired at a standstill of the electric drive, in order to hold the part to be adjusted in the end position. It is therefore an object of the invention firstly to produce a gear mechanism with reliable lubrication, in the case of which gear mechanism the self-locking action can at the same time be set in a targeted manner.

Secondly, for example, a worm gear mechanism is known from EP 1 303 168 B1, in the case of which worm gear mechanism a threaded worm is roller burnished directly onto a metallic armature shaft of an electric motor. By means of the roller burnishing method, a very smooth and strong surface of the toothing system can be provided which is of wear-resistant configuration over its entire service life.

SUMMARY OF THE INVENTION

The method according to the invention and the apparatus according to the invention have the advantage in contrast that, by way of the configuration of a groove structure which extends with the worm flanks of the threaded worm in its circumferential direction, firstly a lubricant reservoir is provided at the highly loaded worm flanks, and secondly the self-locking action of a gear worm of this type can be influenced in a targeted manner. Here, the toothing geometry is first of all produced by way of roller burnishing, which toothing geometry has a surface of defined smoothness. Afterward, grooves which run concentrically with respect to the longitudinal axis of the gear worm are formed in the smooth surface. This has the decisive advantage that the entire surfaces of the worm flanks are supplied continuously with sufficient lubricant, and at the same time there is a direct contact of the tips of the groove structure with the mating toothing system. Said direct contact of the tips of the groove structure with the mating toothing system can be utilized to set the self-locking action of the toothing system. The extent of the lubrication of the toothing system and at the same time also the bearing area of the tips of the groove structure against the mating toothing system can be predefined via the depth of the grooves.

Advantageous developments of the production method and the apparatuses as claimed in the dependent claims are possible by way of the features which are indicated in the dependent claims. For instance, the concentric groove structure can be configured in the roller burnished surface of the worm flanks in a highly targeted manner by means of belt grinding. There is the possibility here to roughen the worm flanks of the gear worm in a targeted manner by way of the grinding belt, by it being possible for circular grooves to be ground in in the circumferential direction. The depth and the radial spacing of the grooves can be predefined in a simple way via the selection of the grinding belt and the contact pressure.

To this end, the flexible grinding belt can particularly advantageously be pressed with a profiled contact piece directly against the surface of the worm flanks. Here, the profile of the contact piece corresponds to the shape of the worm toothing system, with the result that the flexible grinding belt lies flatly against the worm flank in a defined angular segment of the gear worm.

In order to configure concentric regular grooves in the surface of the worm flanks, the belt finishing method is suitable. Here, the grinding belt bears directly against the worm flanks in the tangential direction with respect to the gear worm, with the result that circular grooves can be ground into the worm flanks in the radially outer region of the gear worm in the region of the worm flanks.

Here, the threaded worm with the roller burnished worm flanks is preferably set in rotation, as a result of which the grinding belt is moved along the helical pitch of the worm flanks along the latter, and the tooth flanks are ground over the entire axial region of the threaded worm as a result. By way of the configuration of concentric grooves of this type, the roughness of a groove structure of this type in the circumferential direction is relatively low. As a result, the wear of the grooves is minimized. In the radial direction transversely with respect to the grooves, in contrast, the roughness can be set in a defined manner. At a standstill of the gear mechanism, the lubricant can withdraw into the grooves, with the result that the tips of the groove structure are in direct contact with the mating toothing system, as a result of which the self-locking action can be improved.

In the case of belt grinding, firstly, the roller burnished threaded worm is set in rotation and at the same time the grinding belt has its own advancing speed. The profile of the groove structure can be influenced correspondingly by way of the ratio of said two movements.

A method of this type is highly suitable for mass production of gear worms, in the case of which mass production long metal bars are first of all reshaped by means of through-feed roller burnishing to form a worm, and the concentric grooves are subsequently dug into the worm flanks by means of belt grinding. As a result, in practice yard goods of finished threaded rods with a concentric groove structure can be produced which can then be shortened to the desired length.

A gear worm of this type particularly preferably has a central longitudinal bore, by means of which the threaded worm is pushed onto a gear shaft. Here, the gear shaft can preferably be directly the armature shaft of the electric motor. It is particularly favorable in terms of manufacturing technology if the gear worm is pressed directly on the shaft, preferably onto a previously profiled region of the shaft, in order to configure an interference fit. As an alternative, the threaded sleeve can also be fixed on the shaft by means of adhesive bonding or another material reshaping operation.

For the series production of the threaded rods, the belt grinding can be combined directly with the roller burnishing. Here, for example, the grinding belt can be arranged axially directly downstream of the roller burnishing disks, with the result that, during the forming of the helical threaded worm on the metal rod, the metal rod is displaced axially toward the grinding belt directly after axially passing through the roller burnishing disks. As a result, a large metal rod can be pushed in one working process first of all axially through the roller burnishing tools and, in the same feed movement, axially directly afterward through the grinding apparatus.

In the case of roller burnishing, a high quality highly compressed surface with a roughness of less than 1 µm can be produced in a very simple way, which surface has a long service life. By way of belt finishing, grooves can subsequently be ground in again in the circumferential direction into said smooth surface of the worm flanks, with the result that the surface of the groove structure is roughened in the radial direction to a roughness of Rz=from 0.2 µm to 20 µm. A groove structure of this type reliably prevents the worm flanks from being connected permanently at a standstill of the gear mechanism via an uninterrupted lubricating film to the mating toothing system. A desired self-locking action can be set in this way by virtue of the fact that tips of the grooves then bear directly against the mating toothing system.

The depth and the profile of the grooves can be set both via the properties of the grinding belt and via the contact pressure of the grinding belt or the contact piece. Here, in the case of changed requirements of the self-locking action in accordance with the desired application of the worm gear mechanism, the groove structure in the roller burnished worm flank can be varied correspondingly in a simple way without large tool costs. A method of this type consisting of a combination of roller burnishing and belt finishing is considerably less expensive than a machining production method by means of milling or turning.

A gear worm of this type which is produced according to the invention can be manufactured with a concentric groove structure which is adapted in a targeted manner to the lubricant which is used and to the surface of the mating toothing system.

A metal rod, in particular made from steel, is preferably used as raw material for the gear worm, which metal rod is deformed plastically by means of the roller burnishing disks, in order to provide a very smooth surface of the worm flanks. A defined groove structure can be dug into a roller burnished metal surface of this type by means of the belt grinding, in the case of which the grooves are configured in a very regular and homogeneous manner in the circumferential direction with respect to the worm longitudinal axis.

The use of the gear worm according to the invention in an electric motor drive unit is particularly advantageous, in the case of which drive unit a gear mechanism housing is flange-connected axially directly to an electric motor. Here, the torque is transmitted from the electric motor by means of an armature shaft to a worm gear mechanism which, in addition to the gear worm according to the invention, has a worm gear with a worm gear toothing system, which worm gear is in engagement with the worm flanks. It is particularly favorable here to arrange the gear worm directly on the armature shaft which preferably protrudes axially into the gear mechanism housing. Here, the worm gear is preferably configured from plastic, for example as an injection molded part, and is mounted directly in a rotatable manner in the gear mechanism housing. The worm gear has, for example, an output element which then transmits the stepped-down torque of the electric motor to a part to be adjusted or to be driven. In one alternative embodiment, the gear worm can also be roller burnished directly on the armature shaft of the electric motor and can subsequently be machined by means of belt grinding. A drive unit of this type according to the invention with a high degree of efficiency and an adjustable self-locking action is suitable in a particular way as a window lifter drive, sunroof drive or seat adjusting drive in the motor vehicle.

BRIEF DESCRIPTION OF THE DRAWINGS

Exemplary embodiments of the invention are shown in the drawings and are described in greater detail in the following description. In the drawings.

DETAILED DESCRIPTION

Figure 1:
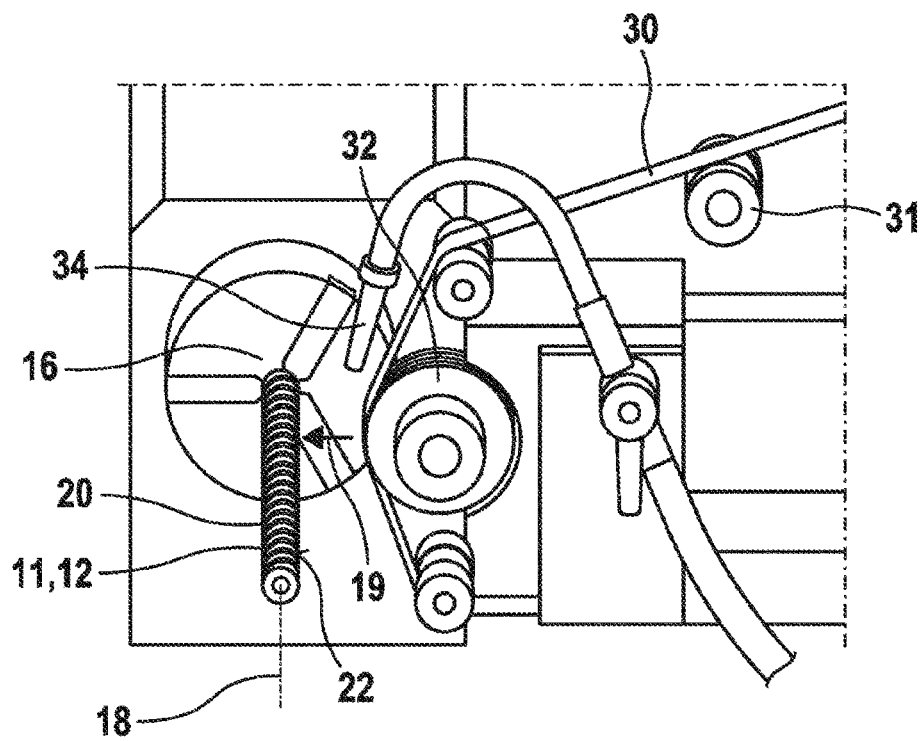
FIG. 1 shows a production method according to the invention for a gear worm.

FIG. 1 diagrammatically shows a method for producing a gear worm 12, in the case of which method a gear worm 12 is first of all formed from a metal rod by means of a roller burnishing tool. A threaded rod 11 of this type with integrally formed worm flanks 22 of a worm toothing system 20 is mounted rotatably in a tool holder 16 in FIG. 1. Subsequently, a groove structure 24 is configured in the worm flanks 22 of the worm toothing system 20. To this end, a flexible grinding belt 30 is set against the threaded rod 11 in the radial direction 19 by means of a profiled contact piece 32 and is pressed against the worm flanks 22. The profiled contact piece 32 is configured in FIG. 1 as an elastic contact roller, for example made from rubber. In an alternative embodiment, the contact piece 32 is configured as a straight rigid guide rail in the direction of the grinding paper, for example made from aluminum, over which guide rail the grinding belt is pulled. Here, the worm flanks 20 run helically about a longitudinal axis 18 of the gear worm 12. Therefore, the grinding belt 30 is pressed in the longitudinal direction 18 against the worm flanks 22, the gear worm 12 being set in rotation in the tool holder 16 at the same time. As a result of said rotation of the gear worm 12, the grinding belt 30 is moved together with the contact piece 32 along the worm flank 22 over the entire length of the threaded worm 12. At the same time, the grinding belt 30 is also set in a relative movement via a separate drive 31. As a result, concentric grooves 25 are ground into the surface of the worm flanks 22. In addition, the grinding belt 30 can be lubricated by means of a lubricating apparatus 34 during the grinding operation. In the case of belt grinding, the grinding belt is guided in the region of the worm flanks 22 tangentially with respect to the gear worm 12, and is pressed axially against the worm flanks 22 by way of the profiled contact piece 32. For example, the length of a threaded rod of this type can be up to 1.5 m, in order then to be cut to the desired length after the grinding operation.

Figure 2:
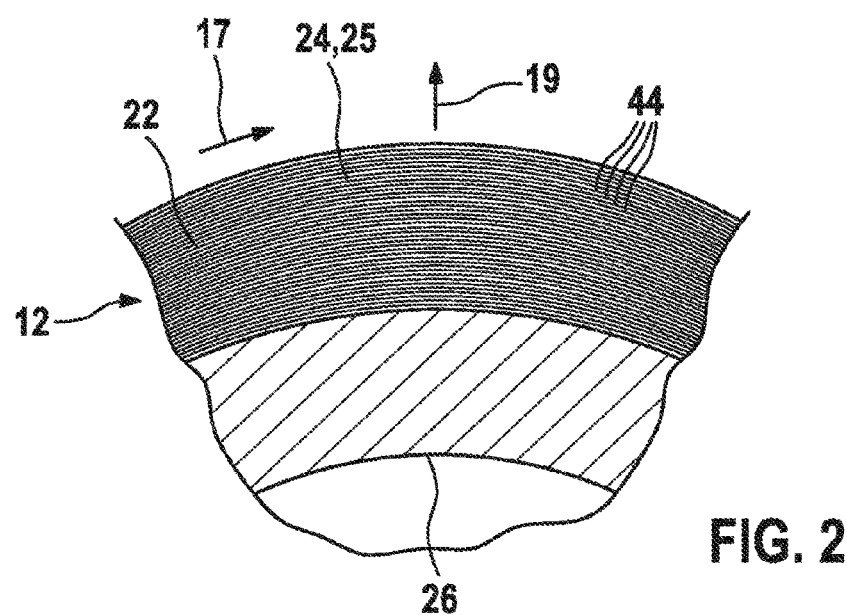
FIG. 2 shows a diagrammatic illustration of a worm flank according to the invention.

FIG. 2 shows a detailed view of the detail of a worm flank 22 which extends helically around a cylindrical main body of the gear worm 12. The worm flank 22 has a pitch, or lead, which defines the transmission ratio of a worm gear mechanism 50. The worm flank 22 was initially configured by means of roller burnishing with a very smooth surface with a roughness Rz of up to 0.2 µm. Afterward, circular grooves 25 were ground into the worm flanks 22, which grooves 25 preferably extend in the circumferential direction 17 over the entire circumference of the gear worm 12. The roughness Rz of the grooves in the radial direction 19 then lies in the range from 0.5 µm to 5 µm. As an alternative, however, the roughness Rz can also lie in the range from 0.2 µm to 20 µm. In the operating state, lubricant is arranged in the grooves 25 as grease reservoir, which lubricant increases the degree of efficiency in the moving state. At a standstill of the gear worm 12, the tips 44 of the groove structure 24 bear directly against the toothing system of the worm gear 52, and the lubricant can withdraw into the grooves 25. Therefore, a worm gear mechanism 50 of this type has a relatively high self-locking action, in order to prevent reversing of the worm gear mechanism 50 in the case of the load-side action of a torque.

Figure 3:
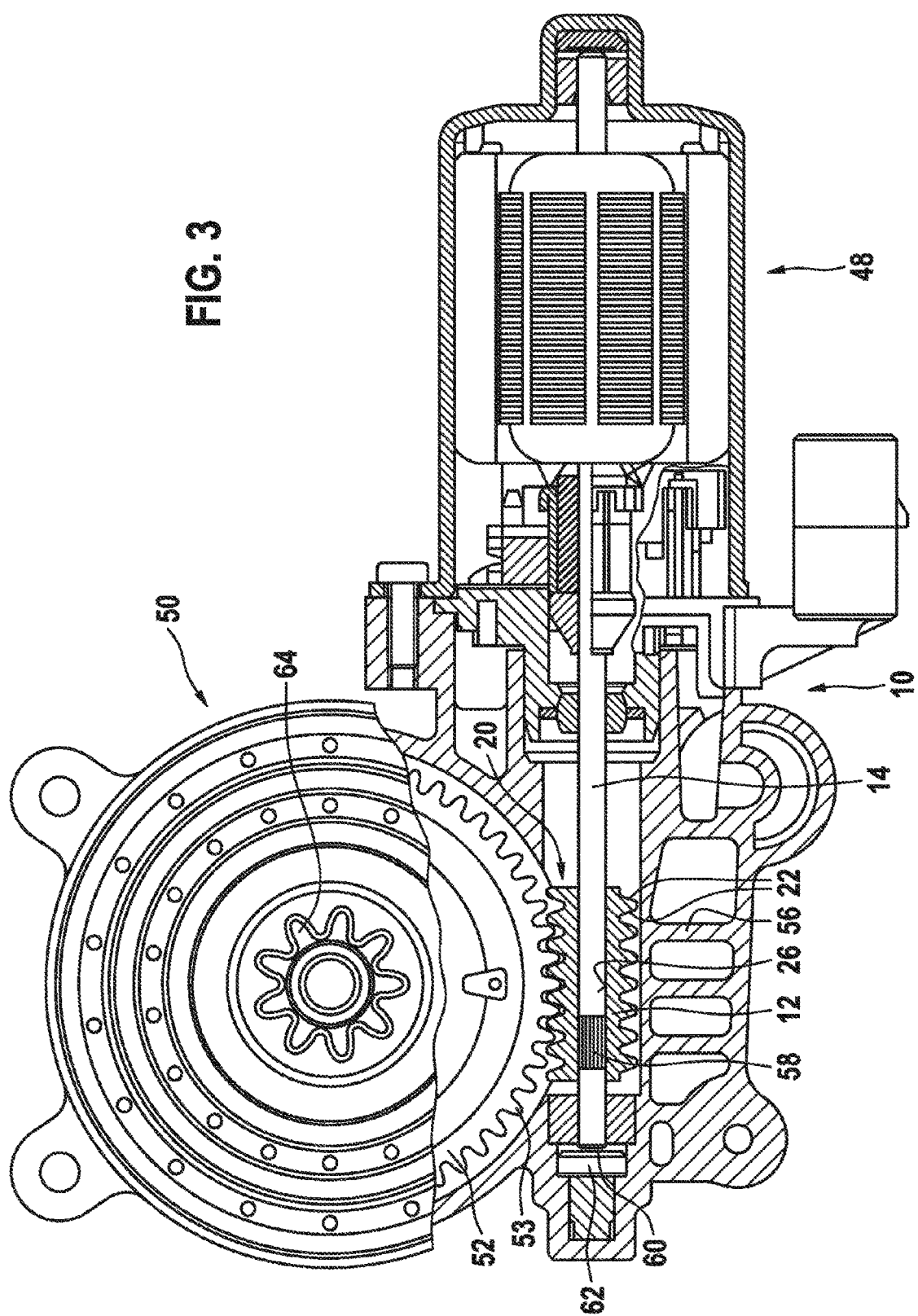
FIG. 3 shows a gear mechanism/drive unit according to the invention.

A gear mechanism/drive unit 10 according to the invention is depicted in FIG. 3. An electric motor 48 has an armature shaft 14 which protrudes into a gear mechanism housing 56 which adjoins the electric motor 48 axially. The gear worm 12 is arranged on the armature shaft 14, in particular is pressed axially onto a reshaped material portion 58 of the armature shaft 14 in the exemplary embodiment. To this end, the gear worm 12 has a bore 26 which extends, for example, as a through opening over the entire axial length of the gear worm 12. The worm toothing system 20 engages into a corresponding mating toothing system 53 of the worm gear 52 which is mounted rotatably in the gear mechanism housing. Here, the tooth flanks 22 of the gear worm 12 bear against the teeth of the worm gear 52. The worm gear 52 is manufactured from plastic here, preferably as an injection molded part. The surfaces of the teeth of the worm gear 52 can also optionally have a certain surface structure in a punctiform manner, which surface structure can be configured as a lubricant reservoir. Circumferential grooves 25 which likewise act as a lubricant reservoir are ground in on the tooth flanks 22 of the gear worm 12. Depending on the rotational direction of the electric motor 48, either a tooth flank 22 of a first axial side of the worm toothing system 20 bears in a force-loaded manner against the teeth 53 of the worm gear 52 or, in the case of an opposite rotational direction, the axially opposite worm flank 22 of the worm toothing system 20 bears in a force-loaded manner against the teeth 53 of the worm gear 52. The free end of the armature shaft 14 is supported radially in the gear mechanism housing 56, in order that the worm toothing system 20 remains reliably in engagement with the teeth 53 of the worm gear 52 even in the case of a great load. The armature shaft 14 is mounted in the longitudinal direction by means of a damping element 62, in order to avoid irritating noise when moving against a stop 60. An output element 64 is arranged on the worm gear 52, which output element 64 transmits the torque, for example, to a part to be adjusted in the motor vehicle. A gear mechanism/drive unit 10 of this type is preferably configured as a window lifter drive or sunroof drive or as a seat adjuster.

It is to be noted that, with regard to the exemplary embodiments which are shown in the figures and in the description, a wide variety of possible combinations of the individual features among one another are possible. Thus, for example, the electric motor 48 can be combined with different gear mechanism designs of the worm gear mechanism 50. The gear worm 12 can likewise be roller burnished directly onto the armature shaft 14, instead of a separately manufactured part, and the concentric grooves 25 can subsequently be formed by means of belt grinding. The threaded worm 12 can likewise be produced with a blind bore 26, by way of which it is pushed onto a shaft. Instead of being pressed on, the gear worm 12 can also be adhesively bonded or can be fastened on a gear shaft in some other way. The production method according to the invention can likewise also be used for applications of gear worms 12 outside of the actuating drive in a motor vehicle.

What is claimed is:

1. A method for producing a gear worm (12), the method comprising forming, with a roller burnishing tool, a worm toothing system (20) with worm flanks (22) which lie axially opposite one another on a longitudinal axis (18), and thereafter configuring on the worm flanks (22) a groove structure (24) which is concentric about the longitudinal axis (18), wherein the concentric groove structure (24) is produced by belt grinding.

2. The method as claimed in claim 1, wherein the gear worm (12) is manufactured as a separate component with a central bore (26) along the longitudinal axis (18), and is subsequently pressed onto a shaft of a drive unit (10).

3. The method as claimed in claim 1, wherein the roller burnishing tool forms an endless worm thread using a through-feed method with the belt grinding method which is linked to it directly, which endless worm thread is afterward cut to the desired length (13) of the gear worm (12).

4. The method as claimed in claim 1, wherein, during roller burnishing, a surface roughness of the worm flanks (22) of Rz of up to 0.5 µm is produced, and the subsequently configured concentric groove structure (24) has a structured roughness of Rz of from 0.2 µm to 10 µm.

5. The method as claimed in claim 1, wherein a surface roughness of the concentric groove structure (24) can be predefined by way of properties of a grinding belt (30) and precision adjustment of process parameters, in order to realize an optimum between a sufficient self-locking action and a satisfactory degree of efficiency of a worm gear mechanism (50).

6. The method as claimed in claim 1, wherein a flexible grinding belt (30), including an abrasive paper, is used for the belt grinding, and the flexible grinding belt (30) is pressed against the worm flanks (22) by a profiled contact piece (32) at the same time against two worm flanks (22) which lie opposite one another in a thread channel.

7. The method as claimed in claim 1, wherein, during roller burnishing, a surface roughness of the worm flanks (22) of Rz of up to 0.1 µm is produced, and the subsequently configured concentric groove structure (24) has a structured roughness of Rz of from 0.2 µm to 10 µm.

8. The method as claimed in claim 1, wherein the gear worm (12) is arranged on an armature shaft (14) of an electric motor drive unit (10).

9. The method as claimed in claim 8, wherein the gear worm (12) is manufactured as a separate component with a central bore (26) along the longitudinal axis (18), and is subsequently pressed onto the armature shaft (14).

10. The method as claimed in claim 1, wherein a flexible grinding belt (30) is used for the belt grinding, and the flexible grinding belt (30) is pressed against the worm flanks (22) by a profiled contact piece (32).

11. The method as claimed in claim 10, wherein, during the belt grinding, the gear worm (12) is set in rotation, and the flexible grinding belt (30) is pulled with the contact piece (32) in the process along the worm flanks (22) by way of the pitch of the worm toothing system (20).

12. The method as claimed in claim 10, wherein the flexible grinding belt (30) is moved at a lower relative speed than a circumferential speed of the worm toothing system (20) as a result of the rotation of the gear worm (12), in order to configure the concentric groove structure (24) on the worm flanks (22).

\* \* \* \* \*